United States Patent [19]

Bächle

[11] Patent Number: 5,718,535
[45] Date of Patent: Feb. 17, 1998

[54] FINISHER FOR ROAD SURFACES WITH A TIRE DRIVE

[75] Inventor: Hans Dieter Bächle, Aerzen, Germany

[73] Assignee: Svedala Strassenfertiger GmbH, Niederlassung Lingen/Ems, Lingen/Ems, Germany

[21] Appl. No.: 625,366

[22] Filed: Apr. 1, 1996

[30] Foreign Application Priority Data

Mar. 31, 1995 [DE] Germany .................... 195 13 192.4

[51] Int. Cl.⁶ .................................................. E01C 19/48
[52] U.S. Cl. .................... 404/101; 180/242; 180/306; 180/307; 180/308
[58] Field of Search .............................. 404/101, 102, 404/108, 110, 83, 90; 180/242, 305, 306, 307, 308

[56] References Cited

U.S. PATENT DOCUMENTS

| | | | |
|---|---|---|---|
| 3,351,147 | 11/1967 | Williamson | 180/306 X |
| 3,997,017 | 12/1976 | Campbell et al. | 180/306 |
| 4,402,377 | 9/1983 | Brooks et al. | 180/307 X |
| 4,805,719 | 2/1989 | Kostamo | 180/307 X |
| 5,190,398 | 3/1993 | Swisher, Jr. | 404/90 |

FOREIGN PATENT DOCUMENTS

4134840  4/1995  Germany .

*Primary Examiner*—James Lisehora
*Attorney, Agent, or Firm*—Cohen, Pontani, Lieberman & Pavane

[57] ABSTRACT

A road surface finisher with a tire drive and a chassis that carries a material bin in the front and, in the rear, a transverse spreading device with an installation beam. A primary drive unit which includes an internal combustion engine and at least one main pump, which drives hydraulic secondary drives of steerable front wheels and of rear wheels, is also mounted on the chassis. The front wheels are driven by hydraulic front wheel motors, and the rear wheels, respectively, are driven by a master drive that includes a hydraulic transport motor and a hydraulic working motor. The hydraulic master drive of the rear wheels and the hydraulic front wheel motors are fed by a single shared drive pump, which is driven by the primary drive unit.

6 Claims, 2 Drawing Sheets

Transport

Installation

FINISHER FOR ROAD SURFACES WITH A TIRE DRIVE

BACKGROUND OF THE INVENTION

1. Field of the Invention

The invention relates to a tire-driven finisher for road surfaces. Such a finisher is known to have a chassis which carries a material bin in the front, in terms of the direction of travel, and, at the rear, a transverse-spreading device with an installation beam.

2. Description of the Prior Art

A road surface finisher with a tire drive is known from DE 41 34 840 A1. This device has a central drive engine/pump unit, steerable front wheels and hydrostatically driven rear wheels. The hydrostatic rear wheel drive unit includes a hydro-adjusting motor with a speed-changing mechanism that can be switched between an extremely slow working speed and a faster transport speed. The rear wheels, respectively, are thereby connected via respective hydrostatic drive units (one per rear wheel), both of which are attached to a hydraulic pump.

The known model therefore requires a hydraulic drive unit on each of the rear wheels. The drive units am comprised of a hydro-adjusting motor, a planetary gear-speed changing mechanism, and a reducing gear part, and are housed in a gear casing and in an internal gear casing. This design is restricted to the rear wheels and requires similar measures to drive the front wheels. The known design is therefore subject to the practical conditions of slip, given a particular underground, which—among other factors—is disadvantageous.

SUMMARY OF THE INVENTION

It is an object of the present invention to improve the known drive system, by simplifying it so that the drive technology of the rear wheels can be linked to that of the front wheels, resulting in lower slip.

Pursuant to this object, and others which will become apparent hereafter, one aspect of the present invention resides in driving the front wheels with hydraulic front wheel motors. The rear wheels, respectively, are driven by a master drive comprising a hydraulic transport motor and a hydraulic working motor. The hydraulic master drive of the rear wheels and the hydraulic front-wheel motors are fed by a single shared drive pump, which is driven by a primary drive unit. The inventive construction has the advantage of a simplified hydraulic system and savings, for example, related to pumps and pump units. Furthermore, the invention ensures lower slip with respect to the distribution of the driving forces to the rear wheels and the front wheels.

Due to the linking the hydraulic circuit of the front wheels to the hydraulic circuit of the rear wheels, during the procedure of finishing a road surface, it is possible to use the transport motor (which is designed as an adjustment motor) of the master drive for the rear wheels as a rotational volume distributor for the front wheel motors. The individual aggregates are thus assigned different tasks as a function of time, which leads to savings in device components and to the above-indicated advantages.

In a further embodiment of the invention, the hydraulic front wheel motors and the hydraulic working motors of the master drive arranged on the rear wheels are disconnected for the purpose of high-speed driving outside of the installation procedure, and the transport motor of the master drive can be activated as the transport drive. This advantage is attained by the separation of the master drive into a hydraulic transport motor and a hydraulic working motor.

According to another embodiment of the invention, a planetary gear unit is flange-mounted in the outer hub of the respective rear wheels and is connected by a coupling to the hydraulic transport motor of the master drive. This makes possible the higher speed during transport movement via a large-ratio gear step.

According to another further embodiment, the primary drive unit is located on a transverse axis relative to the direction of travel. Arranged on this transverse axis, for the left-hand and right-hand sides, respectively, of the finisher, are a first pump for driving operation with an associated control valve, a second pump for a worm drive of the transverse spreading device with an associated control valve, and a third pump for a rammer with an associated control valve. This very clear arrangement of pumps and valves leads to an advantageous load distribution of weight on the primary drive unit. In this way, not only is an advantageous division of space achieved, but also the possibility of systematic placement for all hydraulic lines with a suitable sequence and suitable connections to the particular aggregate.

It is further advantageous to arrange the first, second and third pumps, respectively, in an axis-symmetrical fashion relative to a central longitudinal axis of the vehicle and crosswise on the respective track sides of the front and rear wheels. As a result, an advantageous distribution of weight is attained, which also reduces slip and is especially advantageous at low speeds.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
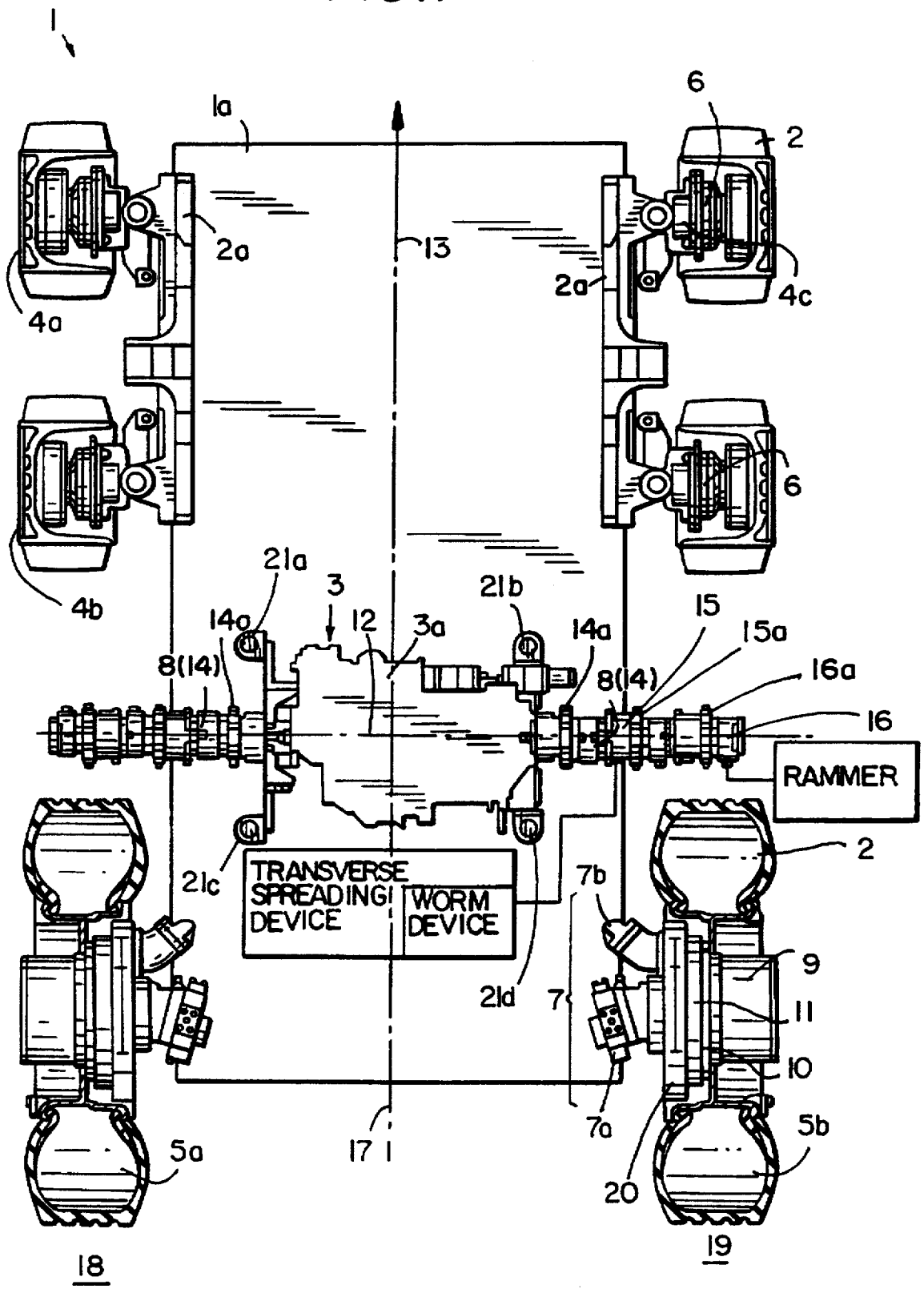
FIG. 1 is a top view of a drive arrangement of the front and rear wheels of a finisher pursuant to the present invention.

As can be seen in FIG. 1, the finisher 1 has a tire drive 2 on a chassis 1a, which is shown schematically. In the direction of travel 13, the chassis carries, in a known manner, a material bin in the front and, in the rear, a transverse spreading device with a worm conveyor and an installation beam. These features are shown schematically in FIG. 1. The finisher 1 is supplied with power by a primary driving unit 3, which comprises, for example, an internal combustion engine 3a (diesel engine). The respective front wheel pairs 4a, 4b are mounted in rotatable and steerable fashion on a suspension 2a. In addition, the rear wheels 5a, 5b are arranged on the chassis.

Each front wheel 4a, 4b carries a front wheel motor 6, which is installed into the interior of the tire by a rim and a front wheel hub 4c.

As a rule, the primary drive unit 3 encompasses a main pump (drive pump) 8, which will be described below in more detail. In this case, the front wheel motors 6 constitute the aforementioned secondary drives.

While the front wheels 4a, 4b are driven by means of hydraulic front wheel motors 6, the rear wheels 5a, 5b, respectively, are driven by a hydraulic master drive 7, which consists of a hydraulic transport motor 7a and a hydraulic working motor 7b.

The hydraulic master drive 7 of the rear wheels 5a, 5b and the hydraulic front wheel motors 6 are fed by a single shared drive pump 8, which is driven by the primary drive unit 3.

The master drive 7 can now work with the transport motor 7a and the working motor 7b in various functions. During installation of the road surface, the transport motor 7a, which is designed as an adjustment motor (axial-cylinder motor), of the master drive 7 for the rear wheels 5a, 5b is used as a rotational volume distributor for the front wheel motors 6. For operation other than installation of the road surface, the hydraulic front wheel motors 6 and the working motors 7b of the master drive 7 arranged on the rear wheels 5a, 5b are disconnected. During transport, the transport motor 7a of the master drive 7 is activated for driving the entire finisher 1.

A planetary gear unit 10, which can be connected to or disconnected from the hydraulic transport motor 7a of the drive via a coupling 11, is flange-mounted in a hub 9 of the rear wheels 5a, 5b. Between the coupling 11 and the working motor 7b or the transport motor 7a, there is at least one further gear step 20 of a toothed gear unit.

The primary drive unit 3 lies on an axis 12 transverse to the direction of travel 13. On this transverse axis 12, there are arranged, for the left-hand side and right-hand side of the finisher 1, respectively, a first pump 14 for driving operation with an associated control valve 14a, a second pump 15 for a worm drive of the transverse spreading device with an associated control valve 15a, and a third pump 16 for a rammer or vibrator with an associated control valve 16a. As those skilled in the art would readily appreciate, this sequence of pump/control valve pairs can be varied.

The first, second and third pumps 14, 15 and 16, respectively, are arranged in an axis-symmetrical fashion relative to a central longitudinal axis 17 of the vehicle and crosswise on respective track sides 18, 19 of the front and rear wheels 4a, 4b; 5a, 5b. The entire unit consisting of the diesel engine 3a with the pump and control devices on both sides is mounted on engine suspension parts 21a, 21b, 21c and 21d.

Figure 2:
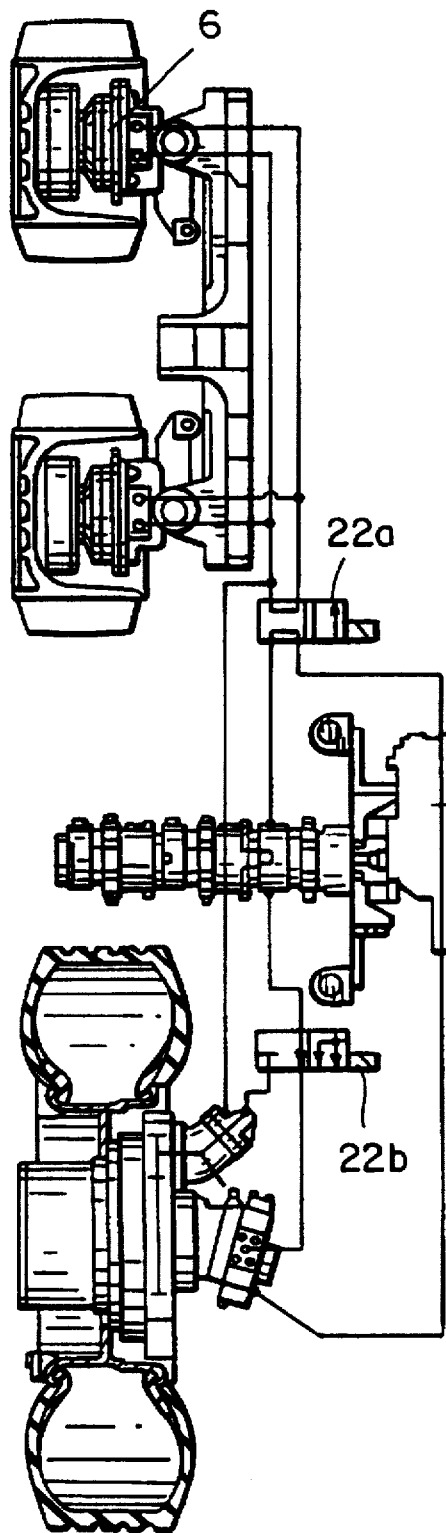
FIG. 2 schematically illustrates the hydraulic circuit for the finisher shown in FIG. 1.
Figure 2:
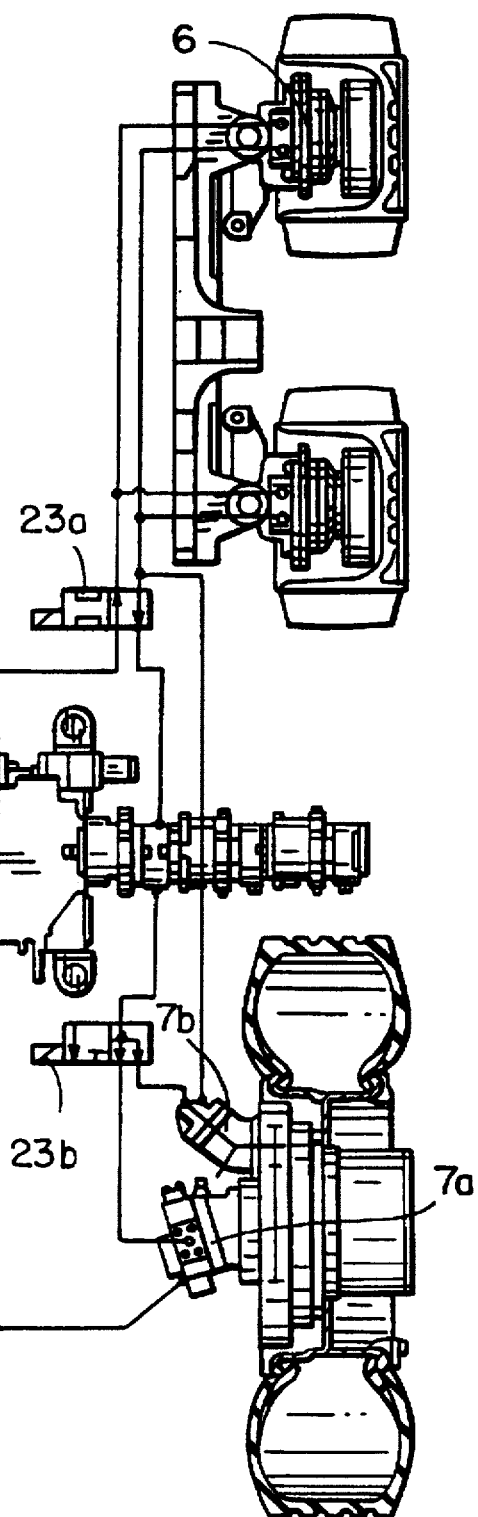

FIG. 2 shows the hydraulic connection of the front wheel motors 6 via the drive pump 8 to the transport motor 7a and the working motor 7b.

On the left of FIG. 2, the circuit is shown in the "transport" position. Starting from the drive pump 8, the hydraulic connections are switched via a front auxiliary valve 22a (electromagnetic directional valve) and a rear auxiliary valve 22b so that, during a transport phase of operation of the finisher, the rear auxiliary valve 22b connects only the transport motor 7a to the driving pump 8.

On the right in FIG. 2, the circuit is shown in the "installation" position wherein the finisher is in an operating phase for installing a road surface. The drive pump 8 is connected by a front auxiliary valve 23a (electromagnetic directional valve) to the front wheel motors 6. The rear auxiliary valve 23b disconnects the transport motor 7a and activates the working motor 7b.

The invention is not limited by the embodiments described above which are presented as examples only but can be modified in various ways within the scope of protection defined by the appended patent claims.

I claim:

1. A finisher for road surfaces, comprising:

a chassis;

steerable front wheels mounted to the chassis;

rear wheels mounted to the chassis;

a hydraulic front wheel motor operatively connected to each of the front wheels;

master drive means provided at the rear wheels for driving the rear wheels, the master drive means including, for each rear wheel, a hydraulic transport motor and a hydraulic working motor;

primary drive means including an internal combustion engine and a main pump, for driving the hydraulic front wheel motors of the steerable front wheels and the hydraulic transport motors and working motors of the rear wheels; and hydraulic circuit means for feeding the hydraulic master drive of the rear wheels and the hydraulic front wheel motors from the main pump.

2. A finisher as defined in claim 1, wherein each of the transport motors is an adjustment motor, the circuit means connecting each adjustment motor to at least one of the front wheel motors in a first operational phase so that the adjustment motor is operative as a rotational volume distributor for the at least one of the front wheel motors for a slow-speed road surface finishing operation.

3. Finisher as defined in claim 1, wherein the circuit means is operative to disconnect the hydraulic front wheel motors and the hydraulic working motors of the master drive in a second operational phase for high-speed driving, the transport motors of the master drive being operative as a transport drive in the second phase.

4. A finisher as defined in claim 1, wherein each of the rear wheels has an outer hub, and further comprising a separate planetary gear unit flange-mounted to the outer hub of each of the rear wheels, respectively, and coupling means for connecting each planetary gear unit to one of the hydraulic transport motors of the master drive.

5. A finisher as defined in claim 1, wherein the primary drive means lies transverse to a direction of travel of the chassis, and further comprising, for a left-hand side and a right-hand side of the chassis, respectively, a transverse spreading device having a worm drive and being mounted on the chassis, a rammer mounted on the chassis, first pump means and an associated control valve for driving the front and rear wheels, second pump means and an associated control valve for the worm drive of the transverse spreading device, and third pump means and an associated valve for the rammer, the first, second and third pump means being arranged on the transverse axis.

6. A finisher as defined in claim 5, wherein the first, second and third pump means, respectively, are arranged in an axis-symmetrical fashion relative to a central longitudinal axis of the chassis and crosswise on respective track sides of the front and rear wheels.

\* \* \* \* \*